Nov. 5, 1929.  H. M. SWARTLEY  1,734,751
WEIGHING DEVICE
Filed July 2, 1928   2 Sheets-Sheet 1

INVENTOR
Harry M. Swartley
By W. W. Williamson
Atty.

Nov. 5, 1929.  H. M. SWARTLEY  1,734,751

WEIGHING DEVICE

Filed July 2, 1928  2 Sheets-Sheet 2

INVENTOR
Harry M. Swartley
By H. H. Williamson
Atty.

Patented Nov. 5, 1929

1,734,751

UNITED STATES PATENT OFFICE

HARRY M. SWARTLEY, OF ROXBOROUGH, PENNSYLVANIA

WEIGHING DEVICE

Application filed July 2, 1928. Serial No. 289,771.

My invention relates to new and useful improvements in a weighing device for vehicles, and has for one of its objects to improve the invention disclosed in my Patent No. 1,584,489, issued May 11, 1926, whereby the indicating or dial portion of the device may be positioned at a distance from the operating mechanism, for instance, the dials may be placed on the body of the vehicle while the operating mechanism which is issued with the frame and axle is connected with the indicator portion by means of a flexible shaft.

Another object of the invention is to provide means for disengaging the parts of the operating mechanism to prevent actuation of the weighing device when unnecessary or undesirable, as while the vehicle is traveling.

A further object of the invention is to provide a lever mounted on an axle or shaft which is journalled in a bracket depending from the vehicle chassis, said lever coacting with a stop mounted on the vehicle axle whereby the lever will be moved and transmit motion through a flexible shaft to an indicating mechanism located on any other suitable part of the vehicle at a distance from said lever.

A still further object of the invention is to provide indicating mechanism for disclosing the weight of a load in a vehicle and said load plus the weight of said vehicle, said indicating mechanism being actuated through the medium of a flexible shaft by operating mechanism associated with the vehicle chassis and rear axle.

With these ends in view, this invention consists in the details of construction and combination of elements hereinafter set forth and then specifically designated by the claims.

In order that those skilled in the art to which this invention appertains may understand how to make and use the same, I will describe its construction in detail, referring by numerals to the accompanying drawings forming a part of this application, in which.

Figure 1:
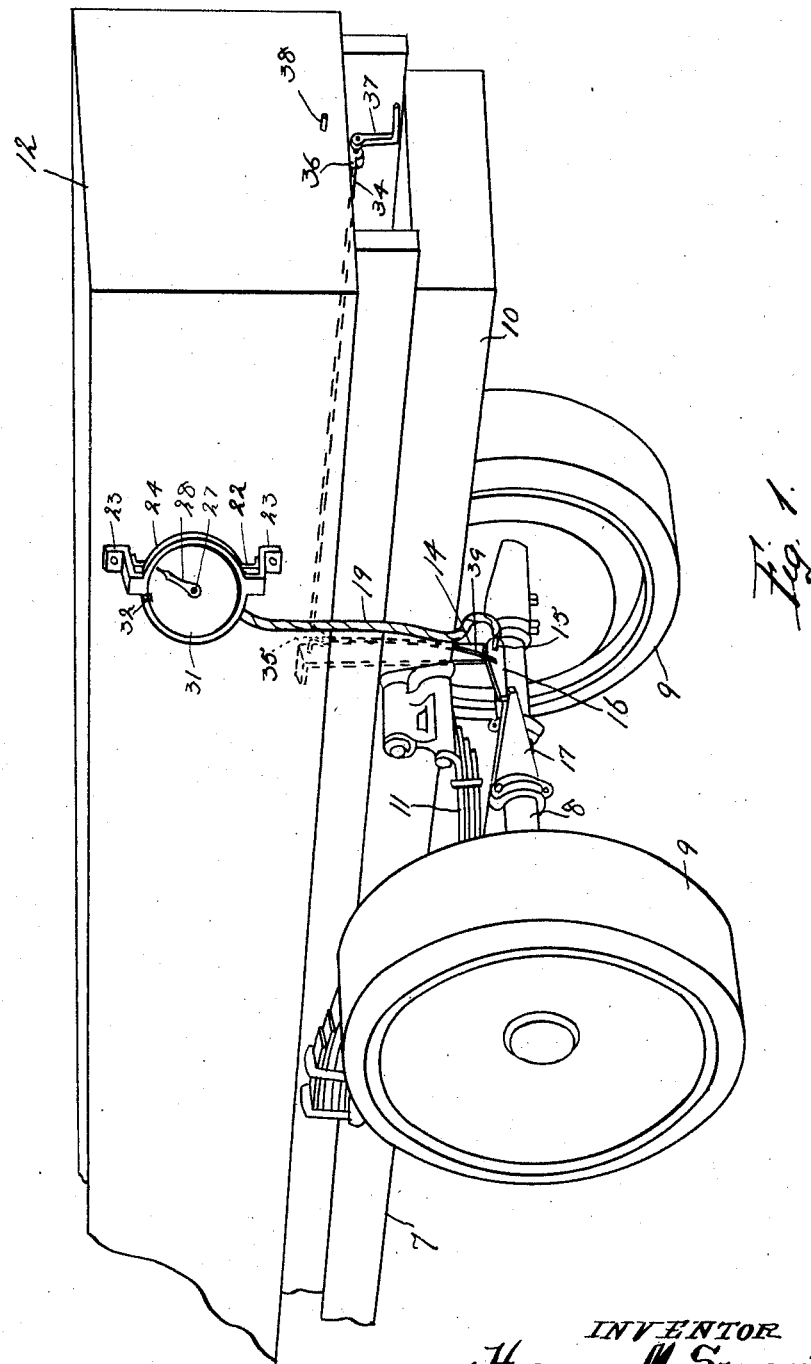
Fig. 1, is a fragmentary perspective view of a vehicle, such as an automobile truck showing my invention applied thereto and illustrating an arrangement that permits the location of the operating mechanism and indicating mechanism at distant points relative to each other.
Figures 2, 3:
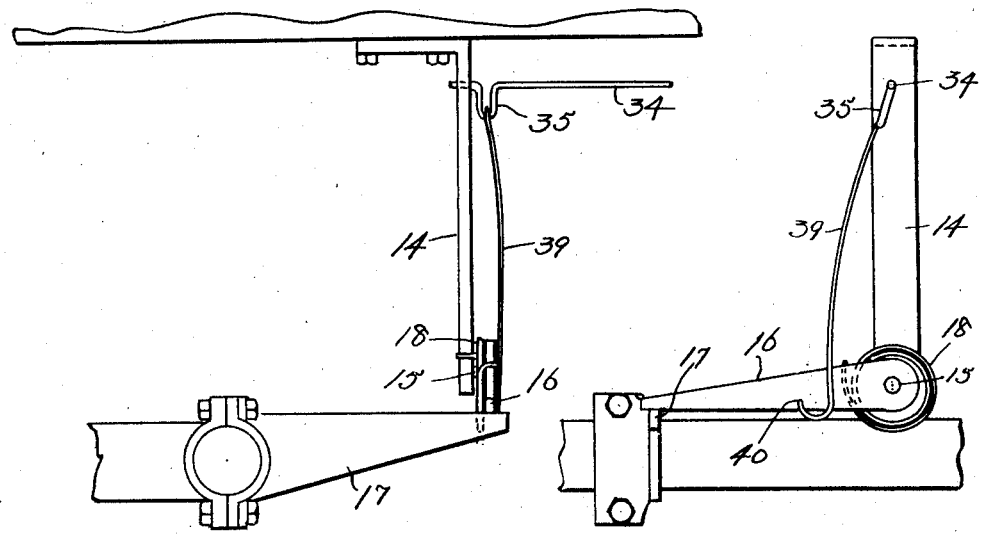
Fig. 2, is a fragmentary side elevation on an enlarged scale of the vehicle showing the relation of the parts of the operating mechanism to the vehicle body and rear axle.
Fig. 3, is an end view of Fig. 2.
Figures 4, 5, 6:
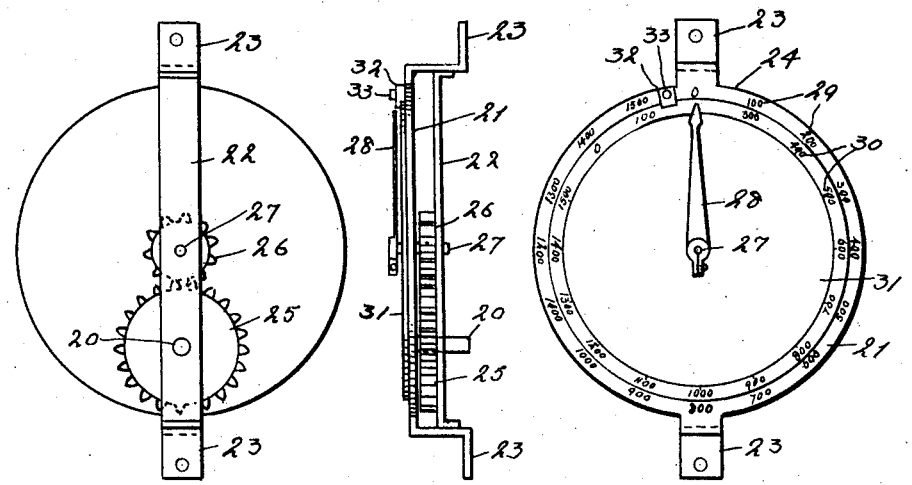
Fig. 4, is an enlarged rear elevation of the indicating mechanism.
Fig. 5, is an edge view thereof.
Fig. 6, is a front face view of the same.

In carrying out my invention as herein embodied, 7 represents a vehicle including a rear axle 8 mounted on the wheels 9 and also mounted on said axle is the frame 10 through the medium of springs 11. On the frame is mounted the box 12 which may be of the stationary or dumping type, and hereafter the frame and box will be considered together as the body.

From the underside of the body depends a bracket 14 in which is journalled a stub shaft 15 carying a lever 16, the free end of which overlies and co-operates with a stop 17 projecting from some suitable portion of the rear axle so that when the body is depressed relative to the axle, the lever 16 will be moved upward in the arc of a circle and when said body moves upward away from the axle, the lever will rotate in the opposite direction due to a spring 18 having one end in engagement with the bracket 14, as the stationary element, and the other end in engagement with the upper edge of the lever 16, as the movable element.

To the stub shaft 15 is connected one end of a flexible shaft 19 while the other end is fixed to a short shaft 20 journalled in the stationary dial 21 and a frame member 22. While I have shown the stationary dial 21 as provided with feet 23 by which the structure may be fastened to a support, it will be understood that said feet might be formed on a frame member to which the stationary dial is secured.

The stationary dial and component parts are elements of the indicating mechanism designated as a whole by the numeral 24, and in addition to said parts, also includes a gear 25 mounted upon the shaft 20 which gear meshes with a pinion 26 on the pointer shaft 27 also journalled in the stationary dial and frame member 22.

Adjustably mounted on the forward end of the shaft 27 is a pointer 28 for co-operation with the numerals 29 and with other numerals 30 on the movable or secondary dial 31 which is journalled on the pointer shaft 27 so as to be revolved thereabout and when the required adjustment of the secondary dial is obtained, it may be held stationary by a clamp 32 connected with the stationary dial by a screw 33 and having its nose overlapping the secondary dial to point it against the stationary dial when the screw is drawn up.

From the foregoing description, it will be obvious that when the vehicle body is moved relative to the axle, the pointer 28 will be actuated through the medium of the lever 16 and the flexible shaft 19. The flexible shaft makes it possible for the indicating mechanism to be located at a distance from the operating mechanism and may be secured to any suitable part of the vehicle, as on the side of the body, as shown, at the back or even adjacent the operator's seat, thus making it possible to locate the indicating mechanism so that it will be out of the way when loading or unloading the vehicle.

In order to disengage the lever 16 from the stop 17 when the weighing device is not in use, and thus prevent the constant jumping movement of the pointer, I provide a crank shaft 34 having a crank 35 adjacent the end which is journalled in the bracket in a bearing 36 on the underside of the vehicle body and provided at its extreme outer end with a crank handle 37, which when moved into engagement with the pin 38, will be held so that the crank 35 is in an elevated position.

To the crank 35 is connected one end of a flexible connector 39 while the other end is suitably fastened to the lever 16 as at 40 and in actual practice, there should be sufficient slack in the connector 39 that there will be no interference with the movements of the lever 16 during the weighing operations.

The operation of the device is as follows:—

The parts being attached as above described, the pointer 28 must be adjusted upon the shaft 27 until it registers with zero upon the primary or stationary dial after which any depression of the vehicle springs 11 will be indicated upon said primary dial by the pointer registering with the numeral 29 corresponding with this depression. From this, it will be thus indicated and as the numeral 29 represents pounds or other weighing units of weight, the load will be thus weighed.

When the device is first applied to the vehicle, the entire weight of said vehicle should be determined and the secondary or movable dial 31 adjusted relative to the stationary or primary dial so that the numerals 30 will indicate the combined weight of the vehicle and load. For example, should the total weight of the vehicle be two hundred pounds, the adjustment of the secondary or movable dial will be such that the number 200 will coincide with zero on the primary or the stationary dial and when the body of the vehicle is loaded, the movement of the pointer 28 will not only indicate the weight of the load by registering with one of the numerals 29 on the stationary dial, but will also indicate the combined weight of the vehicle and its load by registering with the numerals 30 on the secondary dial.

Of course I do not wish to be limited to the exact details of construction as herein shown, as these may be varied within the limits of the appended claims without departing from the spirit of my invention.

Having thus fully described my invention, what I claim as new and useful is:—

1. The combination of a vehicle including a body and axle, of a stop fixed to the axle, a bracket fixed to the body, a stub shaft journalled in said bracket, a lever fixed to said stub shaft and co-operating with the stop to cause rotation of said stub shaft due to movement of the vehicle body relative to this axle, an indicating mechanism including a shaft, a pointer on said shaft and dials from which said pointer moves due to rotation of the last mentioned shaft, and a flexible shaft having one end fixed to the stub shaft and the other end to the pointer shaft.

2. The structure set forth in claim 1, in combination with means to temporarily disengage the lever from the stop when the device is not to be used.

3. In a device of the kind described, a bracket depending from the under side of a vehicle body, a stub shaft journalled in said bracket, a lever mounted on said stub shaft, a stop carried by the axle and co-operating with the free end of said lever to cause the latter to rotate due to movements of the vehicle body relative to its axle, an indicating mechanism located on the vehicle at a distance from the lever, and a flexible shaft connected with said indicating mechanism and the stub shaft to actuate said indicating mechanism.

4. A structure set forth in claim 3, wherein the indicating mechanism comprises a stationary dial having numerals thereon representing units of weight, a secondary dial rotatably mounted on the first mentioned one and also having numerals thereon indicating units of weight and adapted to be manually rotated, means to hold said secondary dial in any adjustment, a pointer shaft, a pointer on one end of said shaft movable over both dials, a pinion carried by the pointer shaft, a shaft to which the flexible shaft is connected, and a gearing on said short shaft meshing with the pinion.

5. A device of the kind described comprising a vehicle including an axle and body, an indicating mechanism, and an operating mechanism connected thereto by a flexible shaft, said operating mechanism comprising a bracket, a lever rotatably mounted on said bracket, and a stop carried by the vehicle axle and co-operating with said lever, a crank shaft journalled beneath the vehicle body, means at the outer end of said shaft to rotate the same, and a flexible connector attached to the lever and to the crank of said crank shaft whereby rotation of said crank shaft in one direction will disengage the lever from its stop.

In testimony whereof, I have hereunto affixed my signature.

HARRY M. SWARTLEY.